United States Patent [19]
DiChiara

[11] Patent Number: 5,801,806
[45] Date of Patent: Sep. 1, 1998

[54] EYEGLASS FRAMES WITH RESILIENT BRIDGE

[76] Inventor: Carmine S. DiChiara, 23 Gregory La., Warren, N.J. 07059

[21] Appl. No.: 841,784

[22] Filed: May 5, 1997

[51] Int. Cl.$^6$ ...................................................... G02C 5/06
[52] U.S. Cl. ........................... 351/126; 351/124; 351/129
[58] Field of Search ................................... 351/124, 126, 351/127, 128, 129, 130, 65, 67, 68

[56] References Cited

U.S. PATENT DOCUMENTS

| | | | |
|---|---|---|---|
| 305,685 | 9/1884 | Franklin | 351/65 |
| 499,554 | 6/1893 | Landry | 351/124 |
| 850,213 | 4/1907 | Day | 351/68 |
| 1,103,118 | 7/1914 | Willson et al. | 351/124 |
| 1,210,038 | 12/1916 | Brennecke | 351/130 |
| 1,278,417 | 9/1918 | Bader | 351/126 |
| 1,663,402 | 3/1928 | Engel | 351/124 |
| 1,666,407 | 4/1928 | Cook | 351/126 |
| 2,103,575 | 12/1937 | Diggins | 351/126 |
| 2,104,063 | 1/1938 | Whitney | 351/136 |
| 2,239,266 | 4/1941 | Epstein | 351/126 |
| 4,377,328 | 3/1983 | Ferrandi | 351/126 |
| 4,494,833 | 1/1985 | Takamura et al. | 351/41 |
| 4,772,112 | 9/1988 | Zider et al. | 351/41 |
| 4,802,753 | 2/1989 | Lhospice | 351/88 |
| 4,896,955 | 1/1990 | Zider | 351/41 |
| 4,902,119 | 2/1990 | Porsche | 351/137 |
| 4,983,029 | 1/1991 | Sato | 351/41 |
| 5,042,934 | 8/1991 | Nakanishi | 351/124 |
| 5,127,723 | 7/1992 | Hyoi | 351/124 |
| 5,351,099 | 9/1994 | Winkler et al. | 351/137 |
| 5,465,122 | 11/1995 | Curto et al. | 351/124 |
| 5,506,637 | 4/1996 | Kita et al. | 351/126 |

*Primary Examiner*—Huy Mai
*Attorney, Agent, or Firm*—Roylance,Abrams,Berdo & Goodman, L.L.P.

[57] ABSTRACT

An eyeglass frame having first and second rims for receiving lenses, temple pieces for positioning the frame over the user's eyes, and a first resilient bridge. The first bridge is coupled between rims and has first and second cables for allowing the rims to pivot about the first bridge between an original position and displaced positions while biasing the rims toward the original position. Each of the cables is rigidly coupled between the rims and formed by multiple strands that are spirally-wrapped around each other. The cables are adjacent one other and spirally-wrapped in opposite directions. The first bridge can include a rotating bar for added stability. The eyeglass frame can also have a second bridge formed of a flexible bar or of at least one cable that has multiple strands that are spirally-wrapped. The second bridge can be a single cable with or without a protective cover, or multiple cables that are spring-biased towards each other. The second bridge configurations can be used with any of the first bridge configurations.

35 Claims, 10 Drawing Sheets

EYEGLASS FRAMES WITH RESILIENT BRIDGE

FIELD OF THE INVENTION

The present invention generally relates to eyeglass frames having one or two resilient bridges that enable rims and their respective lenses to be pivoted about the bridge or bridges from an original position to displaced positions and then returned to the original position by the resiliency of the bridge or bridges. More specifically, the present invention relates to a resilient bridge having two multiple-strand spirally wrapped cables extending between the rims. The first cable is spirally twisted in one direction and the second cable is spirally twisted in an opposite direction to produce the desired resiliency.

BACKGROUND OF THE INVENTION

Typically, eyeglass frames are formed with at least one or two relatively rigid bridges extending between and supporting the rims or eyewires and their respective lenses. However, rigid bridges are not only prone to failure due to the daily manipulation of eyeglasses by the user, but can be deformed under impact or improper use and be uncomfortable for the user. Accordingly, many attempts have been made in the past to provide eyeglass frames with a bridge or bridges that in some way move or flex to increase durability and comfort. However, these prior eyeglass frames are often complex, require expensive and difficult to use materials, and are expensive to manufacture. Additionally, they either do not provide sufficient resiliency, or are not sufficiently durable.

Examples of these prior eyeglass frames are disclosed in the following U.S. Pat. Nos.: 305,685 to Franklin; 499,554 to Landry; 1,103,118 to Willson et al.; 1,210,038 to Brennecke; 1,278,417 to Bader; 1,663,402 to Engel; 1,666,407 to Cook; 2,103,575 to Diggins; 2,104,063 to Whitney; 4,377,328 to Ferrandi; 4,494,833 to Takamura et al.; 4,772,112 to Zider et al.; 4,802,753 to Lhospice; 4,896,955 to Zider et al.; 4,902,119 to Porsche; 4,983,029 to Sato; 5,042,934 to Nakanishi; 5,127,723 to Hyoi; 5,351,099 to Winkler et al.; 5,465,122 to Curto et al.; and 5,506,637 to Kita et al.

Thus, there is a continuing need to provide improved eyeglass frames with a resilient bridge or bridges.

SUMMARY OF THE INVENTION

Accordingly, it is a primary object of the invention to provide an improved resilient bridge or bridges for eyeglass frames that enable the rims and their respective lenses to rotate about a bridge and then return to their original position.

Another object of the invention is to provide a resilient bridge or bridges for eyeglass frames that are easy to manufacture and relatively less expensive and do not require expensive and difficult to use materials.

Yet another object of the invention is to provide a resilient bridge or bridges for eyeglass frames that are sufficiently resilient to provide comfort for the wearer but also sufficiently durable to prevent failure of the bridge or bridges during reasonable impact or minor mishandling.

Still another object of the invention is to provide a resilient bridge for eyeglass frames comprising two multiple-strand cables that are oriented with opposite directions of twist to provide uniform resiliency.

A further object of the invention is to provide two resilient bridges for eyeglass frames, each bridge comprising at least one multiple strand cable for improved resiliency.

2

The foregoing objects are basically attained by providing a frame comprising: first and second securing members for receiving lenses; a retaining device coupled to the first and second securing members for positioning the frame over the user's eyes; and a first bridge coupled between the first and second securing members and having first and second resilient elements for allowing the first and second securing members to pivot about the first bridge between an original position and displaced positions while biasing the first and second securing members toward the original position, each of the first and second resilient elements having first and second ends and a body section extending in a longitudinal direction between the first and second ends, each of the first ends being rigidly coupled to the first securing member and each of the second ends being rigidly coupled to the second securing member, each of the first and second resilient elements having a first torsional resistance to a torsional force applied in a first torsional direction that is transverse to the longitudinal direction of the body section, and a second torsional resistance to the torsional force applied in a second, opposite torsional direction that is transverse to the longitudinal direction of the body section, and the first torsional resistance being greater than the second torsional resistance.

The foregoing objects are also attained by providing a frame comprising: first and second securing members for receiving lenses; a retaining device coupled to the first and second securing members for positioning the frame over eyes; and a first bridge coupled between the first and second securing members and having first and second resilient elements, each of the first and second resilient elements having first and second ends and a body section extending in a longitudinal direction between the first and second ends, each of the first ends being rigidly coupled to the first securing member and each of the second ends being rigidly coupled to the second securing member, each of the first and second resilient elements being sufficiently resilient so that each of the first and second securing members can be pivoted about the first bridge from an original position in two, different rotational directions while the first and second resilient elements twist about each other, the first and second resilient elements acting to return each of the first and second securing members to the original position.

The foregoing objects are further attained by providing a frame comprising: first and second securing members for receiving lenses; a retaining device coupled to the first and second securing members for positioning the frame over eyes; and a first bridge coupled between the first and second securing members and having first and second cables for allowing the first and second securing members to pivot about the first bridge between an original position and displaced positions while biasing the first and second securing members toward the original position, each of the first and second cables having first and second ends and a body section extending in a longitudinal direction between the first and second ends, each of the first ends being rigidly coupled to the first securing member and each of the second ends being rigidly coupled to the second securing member, each of the first and second cables comprising multiple strands that are twisted around each other, the multiple strands of the first cable twisting in a first direction, the multiple strands of the second cable twisting in a second direction and the first direction being opposite to the second direction.

The foregoing objects are still further attained by providing a frame comprising first and second securing members for receiving lenses; a retaining device coupled to the first and second securing members for positioning the frame over the user's eyes; and a first bridge coupled between the first and second securing members and having first and second resilient elements, each of the first and second resilient elements including a spirally wrapped, multi-strand cable.

Other objects, advantages, and salient features of the invention will become apparent from the following detailed description, which, taken in conjunction with the annexed drawings, discloses preferred embodiments of the invention.

DRAWINGS

Referring now to the drawings which form a part of this original disclosure.

DETAILED DESCRIPTION OF THE INVENTION

Referring to FIGS. 1–5, an eyeglass frame 10 in accordance with a first embodiment is illustrated. Eyeglass frame 10 comprises two cylindrical rims 12 and 14 supporting eyepieces or lenses 16 and 18. Eyeglass frame 10 further comprises a bridge 20, two nose pads 22 and 24 and two temple pieces 26 and 28.

Lenses 16 and 18, nose pads 22 and 24, and temple pieces 26 and 28 as well as the connections pertaining to these elements are conventional and known in the art. Accordingly, these elements will only be briefly described herein.

Figure 1:
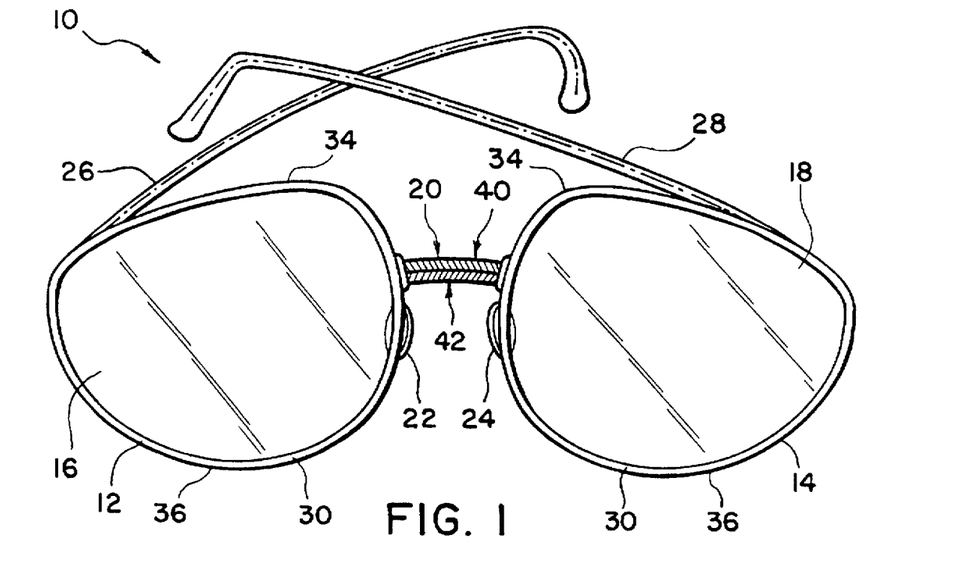
FIG. 1 is a front elevation view of an eyeglass frame in accordance with a first embodiment of the present invention.

Rims 12 and 14 surround and support lenses 16 and 18 in a secure manner that is well-known in the art. Each of rims 12 and 14 has a front 30, a rear 32, a top 34, and a bottom 36. Although rims 12 and 14 are shown as completely encompassing the perimeter of lenses 16 and 18, respectively, it should be understood that rims 12 and 14 can be adapted to only partially encompasses lenses 16 and 18 as is known in the art. Bridge 20 connects rims 12 and 14 as discussed below and helps support rims 12 and 14 in position on the face of the user.

Although rims 14 and 15 have been illustrated as being of a generally oval shape, it should be understood that rims 12 and 14 can take any shape desired that can support and retain lenses 16 and 18. Additionally, lenses 16 and 18 may be either prescription lenses or non-prescription lenses; such as common sunglass lenses.

Rims 12 and 14 are preferably made from a weldable or solderable, metallic material that is sufficiently resilient and flexible to withstand torsional forces that are applied to bend rims 12 and 14 about bridge 20 and forces that are applied to eyeglass frame 10 during use. Preferably, rims 12 and 14 are made from a nickel silver, stainless steel, titanium, or from a Monel alloy. An example of such a preferred material is a nickle silver known as M215 available from Salero Maddalena & Csrl., Solbiate Arno, Italy. Alternatively, rims 12 and 14 can be made from non-metallic material, such as plastic, which is sufficiently resilient and durable and which may be mechanically attached to bridge pieces.

Nose pads 22 and 24 are attached to rims 12 and 14, respectively in a conventional manner and support eyeglass frame 10 on the nose of the user. Temple pieces 26 and 28 are attached to rims 12 and 14, respectively, and are hook-shaped to be positioned behind the ears of the user. It should be understood that temple pieces 26 and 28 can take any configuration that suitably supports eyeglass frame 10 on the user's head. For instance, temple pieces 26 and 28 can be substantially straight or can be a singular piece of elastic material. Although temple pieces 26 and 28 can be made from the same material as rims 12 and 14, they can also be made of material that is different from rims 12 and 14.

Figure 4:
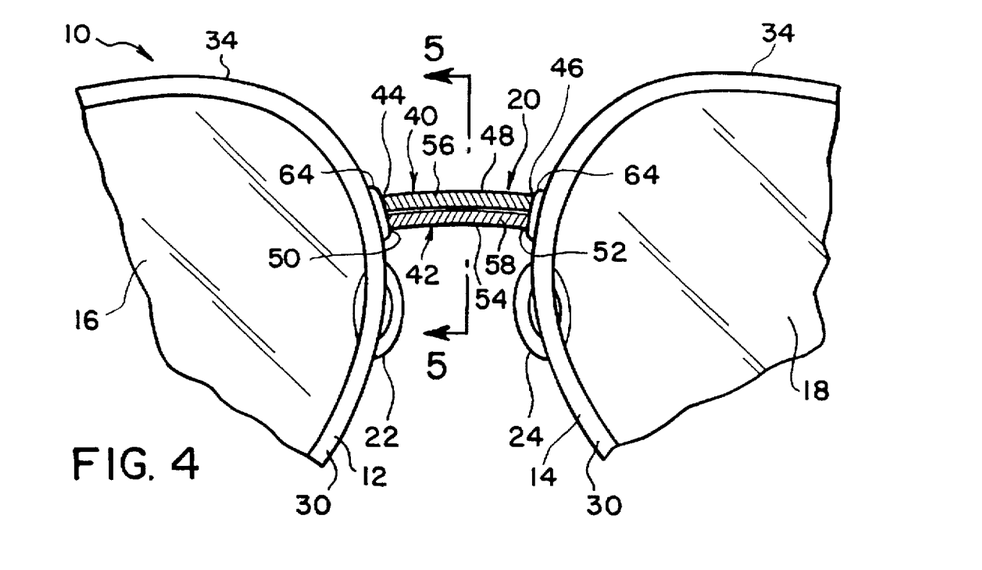
FIG. 4 is an enlarged partial, front, elevational view of the eyeglass frame in accordance with the first embodiment of the present invention as illustrated in FIGS. 1–3.
Figure 5:
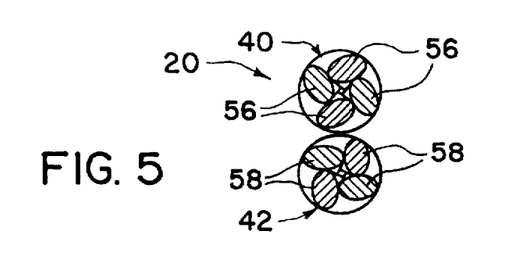
FIG. 5 is an enlarged, cross-sectional view taken along line 5—5 of FIG. 4 and showing the bridge of the first embodiment illustrated in FIGS. 1–4.
Figure 6:
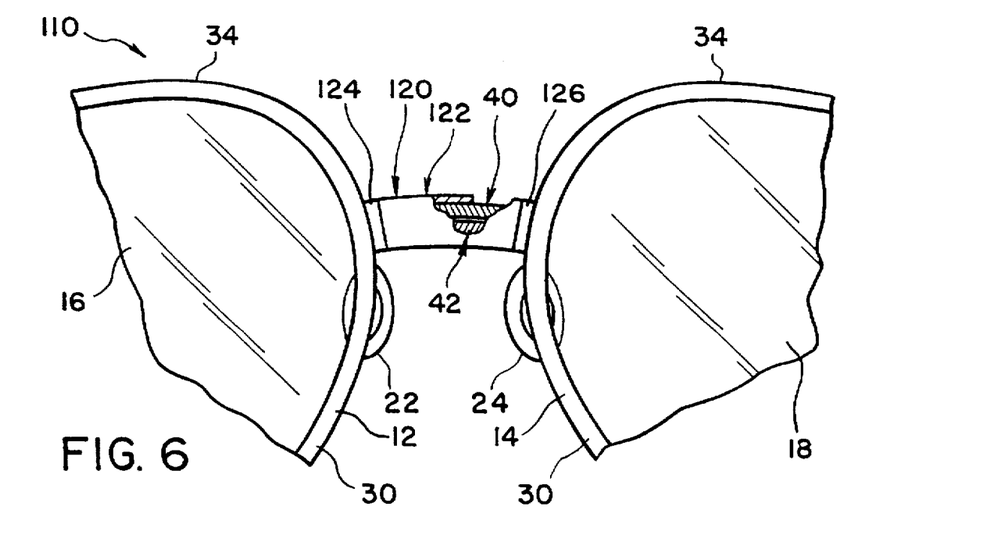
FIG. 6 is a partial, front elevational view of an eyeglass frame in accordance with a second embodiment of the invention.

Bridge 20 comprises an upper resilient element or cable 40 and a lower resilient element or cable 42. Cable 40 has ends 44 and 46 and a longitudinal body section 48. Likewise, cable 42 has ends 50 and 52 and a longitudinal body section 54. Cable 40 is formed by strands 56 that are spirally twisted around each other. In a similar fashion, cable 42 is formed by strands 58 spirally twisted around each other. Strands 56 and 58 are discussed in greater detail below.

Ends 44 and 50 of cables 40 and 42 are rigidly attached to rim 12, and ends 46 and 52 of cables 40 and 42 are rigidly attached to rim 14. The attaching of ends 44, 46, 50 and 52 to rims 12 and 14 is accomplished using an appropriate, conventional manner; such as soldering or welding. It should be understood that cables 40 and 42 can be rigidly attached to rims 12 and 14 in any number of ways. For instance, cables 40 and 42 can be rigidly attached to the exterior surface of rims 12 and 14 by placing a bead 64 of solder or weld at the connection point between cables 40 and 42 and rims 12 and 14 as illustrated in FIG. 4. Additionally, rims 12 and 14 can be configured with recesses (not shown) to receive cables 40 and 42 and soldered, welded or otherwise attached in a known fashion. Further, additional mounting members (not shown) can be positioned between and rigidly attached to each cable 40 and 42 and each rim 12 and 14. Again, the elements can be attached by soldering, welding or any other conventional method.

In the first embodiment of the invention illustrated in FIGS. 1–5, cables 40 and 42 are arranged so that they abut directly against each other and are vertically aligned such that cable 40 is located on top of cable 42. Additionally, cables 40 and 42 are arranged such that they have reverse twist. That is, the direction that strands 56 are twisted to form cable 40, or direction of twist of strands 56, is in a direction which is opposite to that of lower cable 42. In other words, cables 40 and 42 are arranged such that strands 56 of cable 40 twist in one direction and strands 58 of cables 42 twist in the opposite direction. As seen in FIG. 5, strands 56 twist around each other in a counter-clockwise direction, and strands 58 of lower cable 42 twist around each other in a clockwise direction.

Since upper cable 40 and lower cable 42 have reverse twist, bridge 20 uniformly responds to movements of rims 12 and 14 about bridge 20. One of cables 40 and 42 by itself will more easily twist in the direction of unwinding strands 56 or 58, the direction opposite to the direction of twist, than in the direction of twist. Thus, when torsional forces are applied to each of cables 40 and 42 individually, each cable 40 and 42 will offer greater resistance to torsional forces applied in the direction of twist than in the direction of unwinding. In other words, if cable 40 is used as a bridge by itself, without the use of cable 42, cable 40 will provide greater resistance to the twisting of one of rims 12 and 14 in the direction of twist of cable 40 than for twisting one of rims 12 or 14 in the direction of unwinding of cable 40.

However, since the invention uses two cables 40 and 42 with reverse twist, the weaknesses of upper cable 40 are supplemented by the strengths of lower cable 42, and vice versa. The result is bridge 20 that enables rims 12 and 14 to be rotated in any direction about bridge 20 while providing the same amount of resiliency regardless of the rim 12 or 14 which is rotated and regardless of the direction of rotation of rims 12 and 14.

Figure 2:
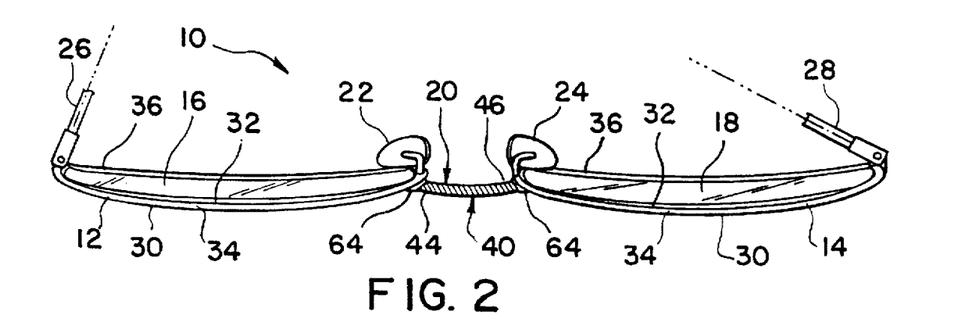
FIG. 2 is a top plan view of the eyeglass frame in accordance with the first embodiment of the present invention as illustrated in FIG. 1 showing the rims and their respective lenses in their original, rest position.
Figure 3:
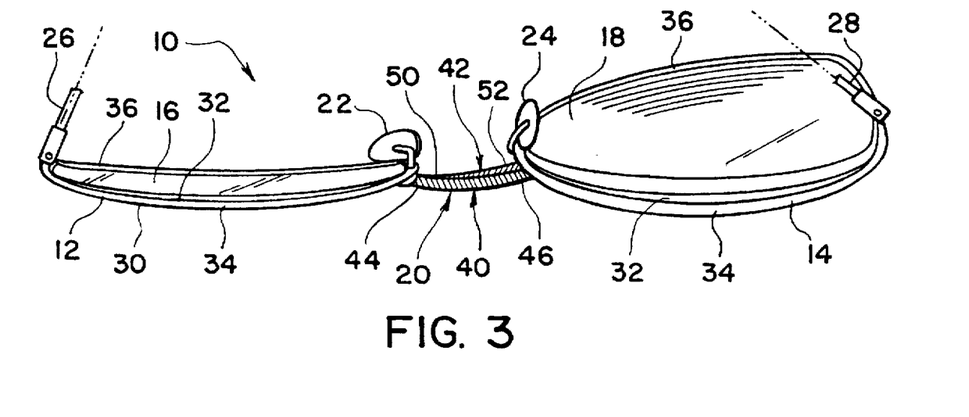
FIG. 3 is a top plan view of the eyeglass frame in accordance with the first embodiment of the present invention as illustrated in FIGS. 1 and 2, and showing one rim with its respective lens rotated about the bridge to a displaced position.

FIG. 2 illustrates eyeglass frame 10 in its original or rest position with rims 12 and 14 and lenses 16 and 18 being generally flat and aligned in a common plane. However, since cables 40 and 42 can be rotated about each other, rim 14, for example, can be rotated about bridge 20 from its original, rest position to a displaced position as seen in FIG. 3. As rim 14 is rotating about bridge 20, cables 40 and 42 are twisting about each other. While ends 44 and 50 of cables 40 and 42, respectively, are rigidly attached to rim 12 and remain in their rest position, ends 46 and 52 are rotated about the axes around which rim 14 is rotating. Thus, cables 40 and 42 begin to twist around each other as seen in FIG. 3.

Due to the resiliency of cables 40 and 42, upon the release of the displacing force acting upon rim 14, rim 14 will rotate from its displaced position shown in FIG. 3 back to its original, rest position shown in FIG. 2. Although this characteristic of bridge 20 has been shown with the movement of rim 14 in one direction, as illustrated in FIG. 3, it should be understood that bridge 20 will respond to similar movements of either rim 12 or 14 and regardless of the direction of rotation about bridge 20.

The physical makeup of cables 40 and 42 and their respective strands 56 and 58 can be varied depending upon the specific resiliency desired by bridge 20. Each cable 40 and 42 is made to identical standards. Although various numbers of stands 56 and 58 can be employed to form cables 40 and 42, preferably each cable 40 and 42 is formed of three to five strands. Further, it is most preferable to use four strands 56 and 58. As seen in FIG. 5, cables 40 and 42 are formed by four strands 56 and 58, respectively.

Additionally, each strand 56 and 58 forming cables 40 and 42 is preferably 0.5–0.7 millimeters in diameter and is preferably formed from AISI 302 steel or other materials having similar characteristics. Further, it is preferred to twist each group of strands 56 and 58 five to six times per inch in order to obtain the preferred resiliency for each cable 40 and 42. It should be understood that although it is preferred to use identical strands 56 and 58 for cables 40 and 42, it is possible to use strands 56 and 58 that are not all identical in, for instance, size, diameter, or material. As long as cables 40 and 42 are identical in their makeup, and configured in frame 10 with reverse twist, the actual makeup of cables 40 and 42 can be greatly varied.

It may be additionally desired to provide a protective covering (not shown) over each cable 40 and 42 individually or provide a single covering (not shown) over both cables 40 and 42. Such coverings would protect both the user of eyeglass frames 10 as well as the cables 40 and 42 themselves. This protective covering would amount to a protective skin made from thin stainless steel or other metallic materials, or a thin plastic tube.

Embodiment of FIGS. 6–9

Referring to FIGS. 6–9, an eyeglass frame 110 in accordance with a second embodiment of the present invention is illustrated. Eyeglass frame 110 is substantially identical to eyeglass frame 10 described above with respect to the first embodiment except for the specific structure of bridge 120 and its attachment to rims 12 and 14. Therefore, only those portions of eyeglass frame 110 relating to bridge 120 will be described in detail. Additionally, those elements of eyeglass frame 110 that are substantially identical to elements of eyeglass frame 10 will employ the reference numerals of the previous embodiments and will not be discussed in detail.

Bridge 120 of eyeglass frame 110 comprises a rotating structural bar 122, mounting attachments 124 and 126, screws 128 and 130, and cables 40 and 42.

Figure 8:
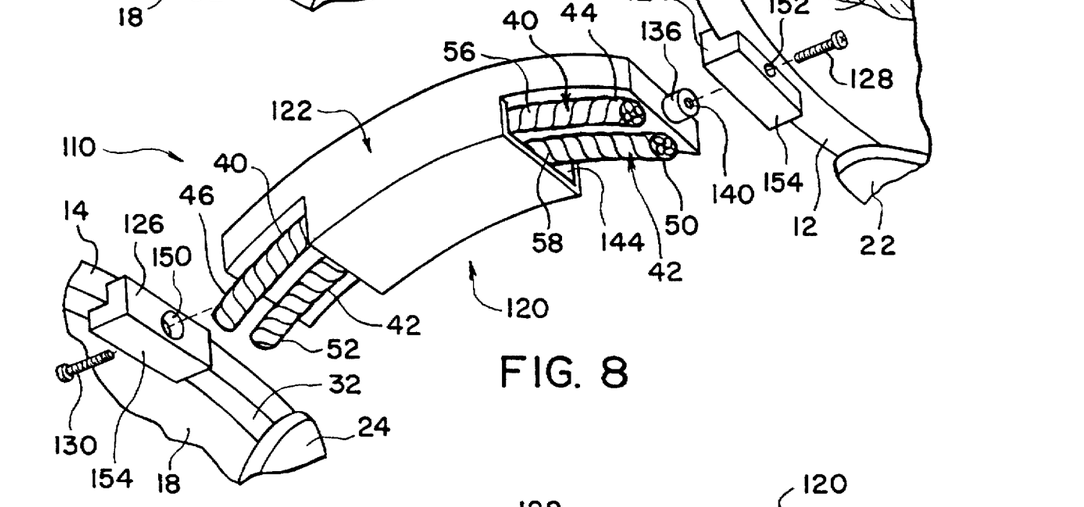
FIG. 8 is an exploded, top-rear perspective view of the bridge in accordance with the second embodiment of the present invention as illustrated in FIGS. 6–7.
Figure 9:
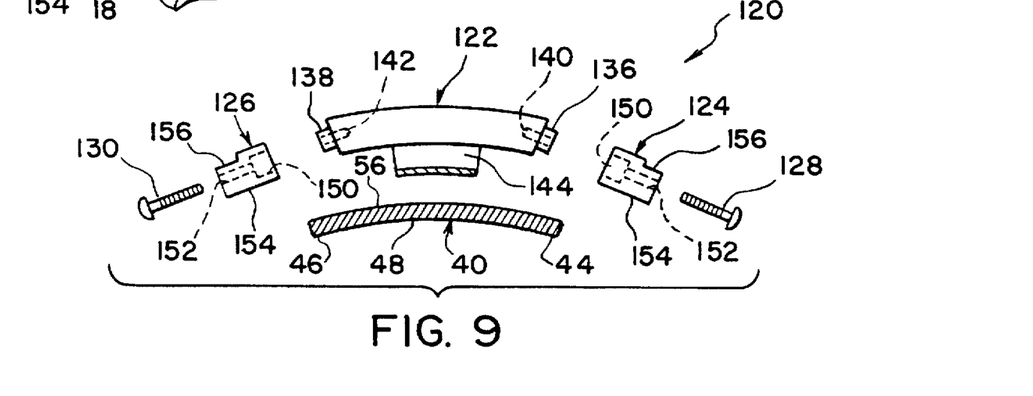
FIG. 9 is a top, plan, exploded view of the bridge in accordance with the second embodiment of the present invention as illustrated in FIGS. 6–8.

Structural bar 122 comprises trunions 136 and 138 for insertion into mounting attachments 124 and 126, respectively. Additionally, trunions 136 and 138 have central internal threaded openings 140 and 142, respectively. Threaded openings 140 and 142 are adapted to receive screws 128 and 130, respectively. Structural bar 122 further has a through passageway 144 for receiving cables 40 and 42. Structural bar 122 is made from metallic material and is generally arc-shaped to provide additional room for the nose of the wearer.

Mounting attachments 124 and 126 are substantially identical. Each mounting attachment 124 and 126 has an aperture 150 for receiving its respective trunion 136 or 138 and a threaded hole 152 for receiving its respective screw 128 or 130. Additionally, each mounting attachment 124 and 126 has a soldering surface 154 for receiving its respective ends 46 and 52 or 44 and 50 of cables 40 and 42, and a rim receiving area 156 for receiving rim 14. Mounting attachments 124 and 126 are made from metallic material similar to that of structural bar 122.

Although mounting attachments 124 and 126 have been illustrated as having a soldering or welding surface 154, it should be understood that mounting attachments 124 and 126 can receive cables 40 and 42 in a number of ways to supplement the attachment by conventional methods such as soldering. For instance, the location of soldering or welding surface 154 can have recesses therein conforming to and receiving ends 44, 46, 50 and 52 of cables 40 and 42 therein. Additionally, bores can be provided in mounting attachments 124 and 126 for receiving cables 40 and 42 therein.

Figure 7:
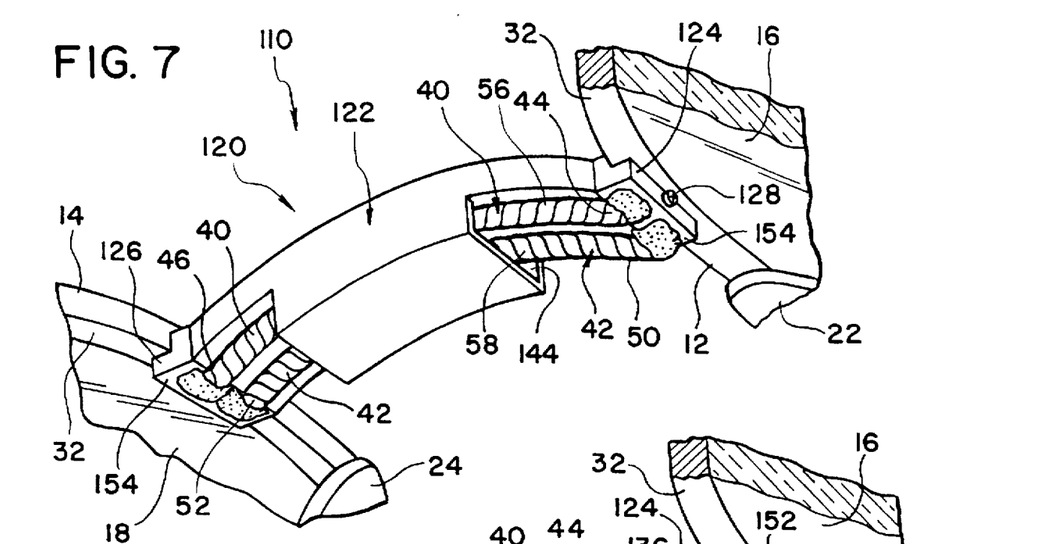
FIG. 7 is a top-rear perspective view of the bridge of the eyeglass frame in accordance with the second embodiment of the present invention as illustrated in FIG. 6.

Cables 40 and 42 are received within passageway 144 and extend completely through passageway 144. Passageway 144 is sufficiently large so that cables 40 and 42 can move freely therein and are capable of twisting about each other to the degree necessary to allow rims 12 and 14 to rotate about lower bridge 120 as desired. Cables 40 and 42 extend beyond the ends of structural bar 122. Thus, cables 40 and 42 are longer than structural bar 122 so that they can extend to mounting attachments 24 and 26 as seen in FIG. 7. Cables 40 and 42 are configured in substantially the same manner as discussed above with respect to eyeglass frame 10 and the first embodiment of the present invention. That is, cables 40 and 42 are oriented so that they have opposing twist directions.

Since the relationship between structural bar 122, mounting attachments 124 and 126, screws 128 and 130, and cables 40 and 42 is identical for each of the two ends of structural bar 122, only one end of bridge 120 will be described in detail. Trunion 136 is sized to be received within aperture 150 so that trunion 136 can rotate freely therein. Opening 140 within trunion 136 is aligned with unthreaded hole 152 in mounting attachment 124 so that screw 128 can be received within hole 152 and within threaded opening 140. Since screw 128 threadedly engages opening 140, structural bar 122 is secured to mounting attachment 124 in a rotatable manner. When structural bar 122 and mounting attachment 124 are fully engaged, cables 40 and 42 extend beyond structural bar 122 and rest on soldering or welding surface 154. Cables 40 and 42 are rigidly coupled to soldering or welding surface 154 in a conventional manner; such as soldering or welding. Mounting attachment 124 receives an edge of rim 12 within rim receiving area 156. Mounting attachment 124 can than be rigidly coupled to rim 14 at rim receiving area 156 in any conventional manner; such as soldering or welding.

The assembled bridge 120 as illustrated in FIG. 7 results in a structural bar 122 that is free to pivot about its trunions 136 and 138 relative to adapters 124 and 126 and rims 12 and 14. Cables 40 and 42 are rigidly attached to adapters 124 and 126 which, in turn, are rigidly attached to rims 12 and 14, respectively. Thus, cables 40 and 42 function in an identical manner as described above with respect to eyeglass frame 10 of the first embodiment of the present invention illustrated in FIGS. 1–5. However, with the addition of structural bar 122, bridge 120 provides additional stability between rims 12 and 14.

Embodiment of FIGS. 10–13

Figure 10:
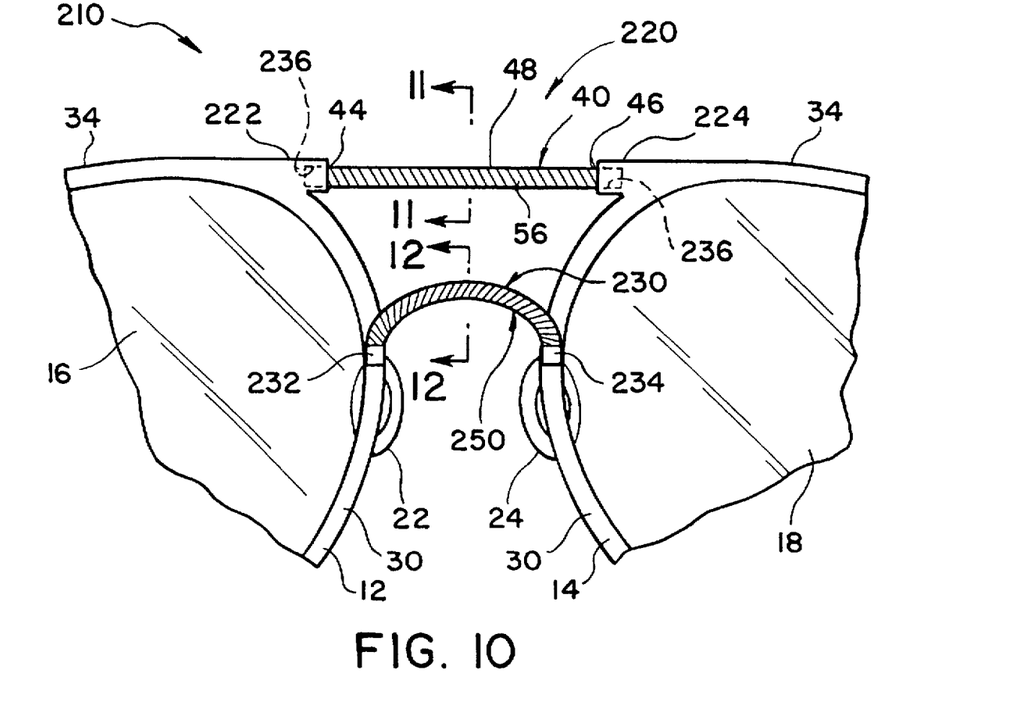
FIG. 10 is a partial, front elevational view of an eyeglass frame in accordance with a third embodiment of the present invention.
Figure 11:
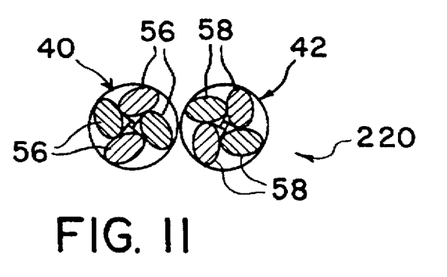
FIG. 11 is an enlarged, cross-sectional view taken along line 11—11 of FIG. 10 and illustrating the cables of the upper bridge in accordance with the third embodiment of the present invention.
Figure 12:
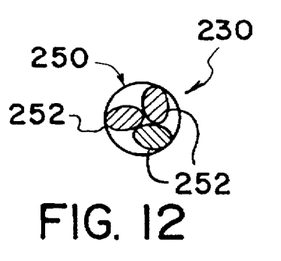
FIG. 12 is an enlarged cross-sectional view taken along line 12—12 of FIG. 10 illustrating the cable of the lower bridge in accordance with the third embodiment of the present invention.

Referring to FIGS. 10–12, an eyeglass frame 210 is illustrated in accordance with a third embodiment of the present invention. Eyeglass frame 210 is substantially identical to eyeglass frames 10 and 110 of the previous embodiments except for the bridge connections between rims 12 and 14. Accordingly, only the connection between rims 12 and 14 in eyeglass frame 210 will be discussed in detail. Additionally, those elements of eyeglass frame 210 that are substantially identical to elements of eyeglass frames 10 and 110 will employ reference numerals of the previous embodiments and will not be discussed in great detail.

Eyeglass frame 210 has an upper bridge 220 secured to rims 12 and 14 by supports 222 and 224, respectively. Upper bridge 220 further comprises cables 40 and 42. Also, eyeglass frame 210 comprises lower bridge 230 that is connected to rims 12 and 14 by connectors 232 and 234, respectively.

Cables 40 and 42 within eyeglass frame 210 are identical to the cables described above with respect to the previous embodiments. However, in eyeglass frame 210, cables 40 and 42 are positioned at the top 34 of rims 12 and 14 and secured thereto by supports 222 and 224.

Supports 222 and 224 are an integral attachment to rims 12 and 14, respectively. Supports 222 and 224 can be formed of one-piece construction with their respective rims 12 and 14 and made from the same material as rims 12 and 14. Alternatively, supports 222 and 224 can be made from a material that is different from rims 12 and 14 and then rigidly attached to rims 12 and 14 in a conventional manner; such as soldering or welding.

Each support 222 and 224 is generally rectangular in cross-section and has two circular bores 236 therein. Each bore 236 receives one of ends 42, 46, 50 and 52 of cables 40 and 42. Bores 236 are sufficiently deep to allow cables 40 and 42 to be received therein and securely fastened by conventional methods; such as soldering or welding. Thus, as with the previous embodiments, upper bridge 220 has two cables 40 and 42 adjacent to each other and extending between and being rigidly attached to rims 12 and 14.

As seen in FIG. 11, cables 40 and 42 are arranged to abut each other in a side-by-side relationship along a horizontal plane. Similar to the previous embodiments, cables 40 and 42 are oriented relative to each other so that cable 40 has an opposite direction of twist from that of cable 42. The arrangement of cables 40 and 42 illustrated in FIGS. 10 and 11 produces an identical affect on rims 12 and 14 as is described above with respect to the dual cable bridges 20 and 120 discussed above.

Figure 13:
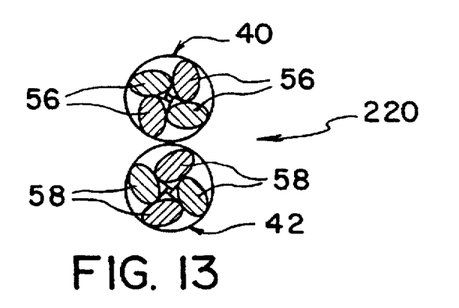
FIG. 13 is an enlarged, cross-sectional view similar to that of FIG. 11 but illustrating an alternative orientation of the cables of the upper bridge in accordance with the third embodiment of the present invention as illustrated in FIGS. 10–12.

FIG. 13 illustrates an alternative configuration for cables 40 and 42. The configuration of cables 40 and 42 illustrated in FIG. 13 is identical to that of FIG. 11 except that cables 40 and 42 are rotated 90° to a substantially vertical orientation with cable 40 being on top of cable 42. The difference in configurations between FIG. 11 and FIG. 13 does not produce a substantial difference in the manner in which upper bridge 220 functions.

Lower bridge 230 of eyeglass frame 210 is rigidly coupled to connectors 232 and 234 in any conventional manner, preferably by soldering or welding. Connectors 232 and 234, in turn, are rigidly connected to rims 12 and 14, respectively, by any conventional manner, preferably soldering or welding. Therefore, lower bridge 230 extends between and is rigidly coupled to rims 12 and 14.

Lower bridge 230 preferably comprises a singular cable 250 that is made of multiple, spirally twisted strands 252. Preferably, strands 252 are formed of metal twisted together in a similar manner as described above with respect to cables 40 and 42. However, cable 250 preferably has only three strands 252 that are twisted about each other. Also, preferably six twists per inch are made of the three strands 252 around each other to achieve the desired resilient characteristics of cable 250. Although strands 252 can be made from various materials, and in various sizes and configurations, strands 252 are preferably 0.40 millimeters in diameter and are preferably made from AISI 302 steel. Alternatively, a flexible, resilient member in the form of a single piece of material, such as a bar, having substantially similar characteristics as cable 250 can be used as lower bridge 230.

Also, cable 250 may be covered in a similar manner as described above with respect to cables 40 and 42. That is, cable 250 can be covered with a thin skin of metal or plastic to protect the wearer and cable 250.

Cable 250 is sufficiently resilient to allow rims 12 and 14 to rotate about upper bridge 220 and be displaced from an original, rest position. Also, cable 250 is sufficiently resilient to return to its original configuration when rims 12 and 14 return to their original, rest position due to the resilient characteristics of cables 40 and 42.

Cable 250 will also aid in the return of rims 12 and 14 to their original position from displaced positions. Further, cable 250 acts to further support rims 12 and 14 and assists in making eyeglass frame 210 more stable. Cable 250 extends on front 30 of rims 12 and 14 and has a curved shape to avoid contacting the nose of the user and to allow travel for rims 12 and 14 to rotate.

Figure 14:
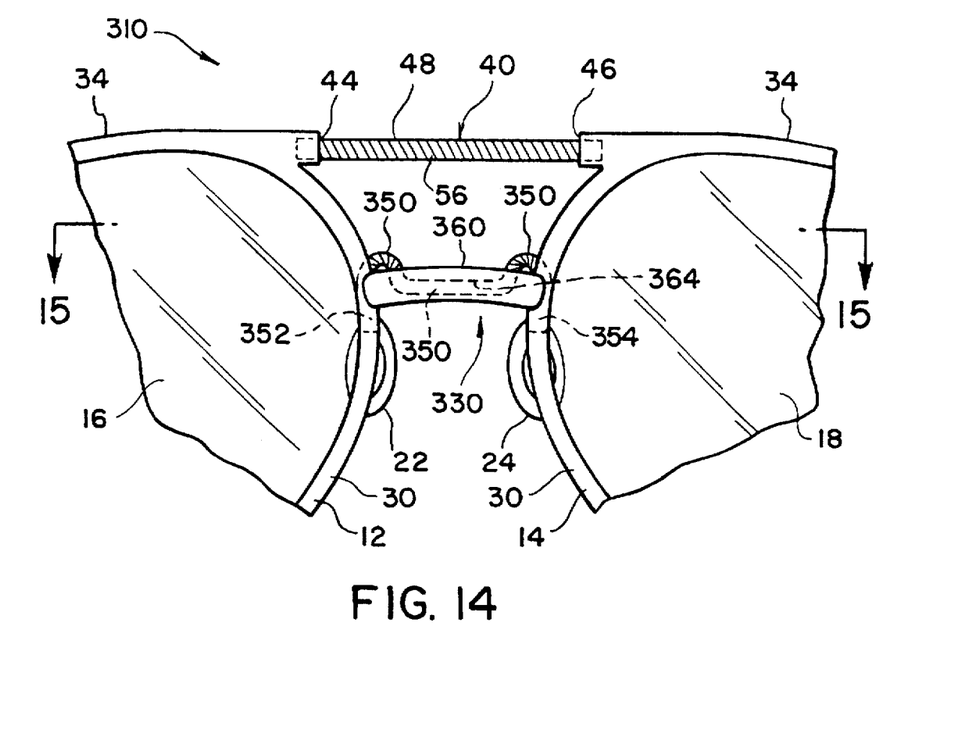
FIG. 14 is a partial, front elevational view of an eyeglass frame in accordance with a fourth embodiment of the present invention.
Figure 15:
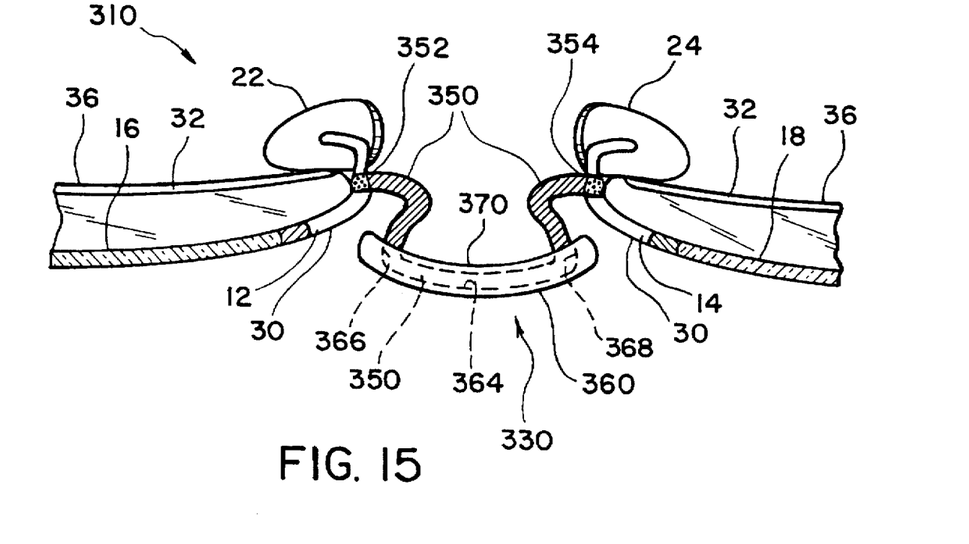
FIG. 15 is a cross-sectional view taken along line 15—15 of FIG. 14 and illustrating the lower bridge of the fourth embodiment of the present invention.

Embodiment of FIGS. 14–15

Referring to FIGS. 14 and 15, an eyeglass frame 310 in accordance with a fourth embodiment is illustrated. Eyeglass frame 310 is substantially identical to eyeglass frame 210 discussed above with respect to the third embodiment except for the structure of lower bridge 330. Therefore, only lower bridge 330 and its attachment to rims 12 and 14 will be discussed in detail. Additionally, those elements of eyeglass frame 310 that are substantially identical to elements of the eyeglass frames of the previous embodiments, especially eyeglass frame 210, will employ the reference numerals of the previous embodiments and will not be discussed in great detail.

Lower bridge 330 comprises a cable 350 and a cover 360. Cable 350 has ends 352 and 354 that are rigidly connected to rear 32 of rims 12 and 14, respectively. Ends 352 and 354 can be attached to rims 12 and 14 in any conventional manner. Preferably, ends 352 and 354 are soldered or welded to rims 12 and 14.

Cable 350 is identical to cable 250 discussed above with respect to the third embodiment and therefore the physical characteristics of cable 350 will not be discussed in great detail. Cable 350 extends from rear 32 of rims 12 and 14 and is curved to project along front 30 of rims 12 and 14 so that cable 350 does not interfere with the nose of the user, while still providing sufficient resiliency and stability.

Cable 350 extends within cover 360 by extending through a channel 364 that extends completely through cover 360 between a first opening 366 and a second opening 368. Both openings 366 and 368 being on a rear side 370 of cover 360 and facing rear 32 of rims 12 and 14.

Cover 360 can be made from any material that enables cable 350 to retain sufficient resiliency. Preferably, cover 360 is made of metal or plastic material and can be made to match rims 12 and 14 in color and/or design.

Figure 16:
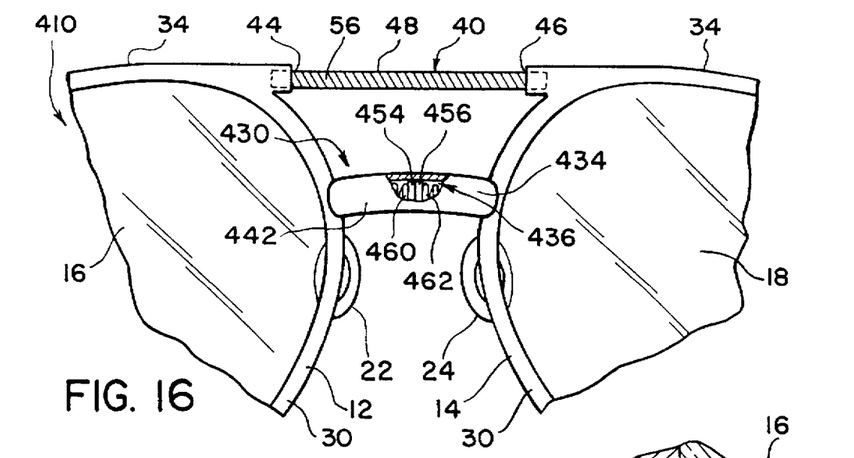
FIG. 16 is a partial, front elevational view of an eyeglass frame in accordance with a fifth embodiment of the present invention.
Figure 17:
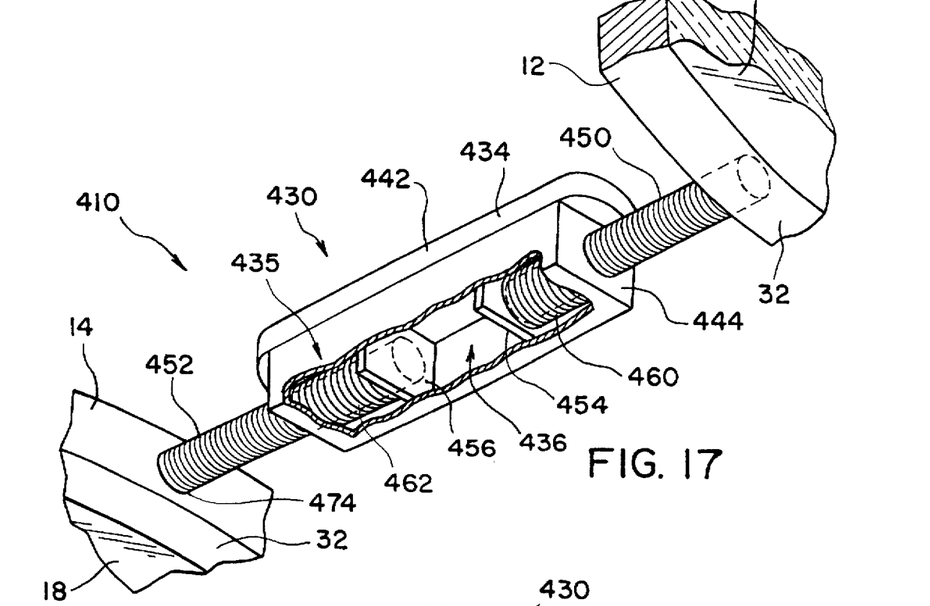
FIG. 17 is an enlarged, partial, top-rear perspective view of the lower bridge in accordance with the fifth embodiment of the present invention as illustrated in FIG. 16.
Figure 18:
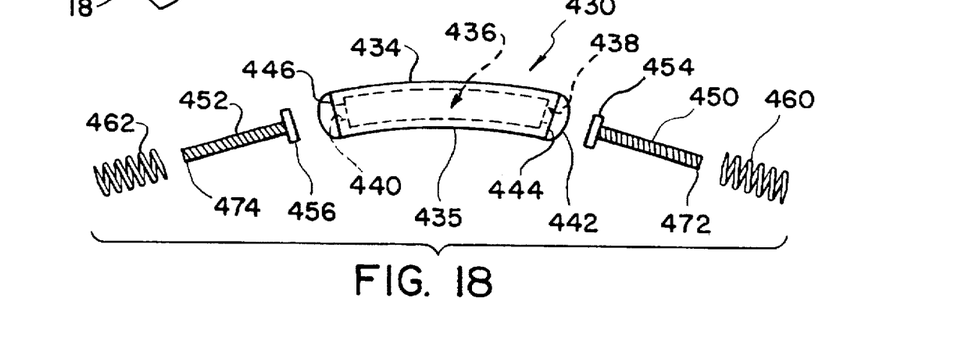
FIG. 18 is a rear exploded view of the lower bridge in accordance with the fifth embodiment of the present invention as illustrated in FIGS. 16 and 17.

Embodiment of FIGS. 16–18

Referring to FIGS. 16–18, an eyeglass frame 410 in accordance with a fifth embodiment of the present invention is illustrated. Eyeglass frame 410 is substantially identical to eyeglass frames 210 and 310 discussed above with respect to the third and fourth embodiments of the present invention except for the structure of lower bridge 430. Accordingly, only lower bridge 430 of eyeglass frame 410 and its connections with rims 12 and 14 will be discussed in detail. Additionally, those elements of eyeglass frame 410 that are substantially identical to elements of the eyeglass frames of the previous embodiments, especially eyeglass frames 210 and 310, will employ the reference numerals of the previous embodiments and will not be discussed in great detail.

Lower bridge 430 comprises an intermediate member or housing 434, cables 450 and 452, and bias elements or springs 460 and 462. Housing 434 has a casing 435 with cavity 436 and openings 438 and 440 thereto through end walls 444 and 446, respectively. Additionally, housing 434 has a front cover 442 that is rigidly coupled to casing 435 and encloses cavity 436. Front cover 442 is unattached to rims 12 and 14 but is sufficiently long to extend between rims 12 and 14 when rims 12 and 14 are in the original, at rest position as illustrated in FIG. 16. Front cover 442 provides an aesthetically pleasing appearance to lower bridge 430. Housing 434 and cavity 436 are generally arc-shaped but with a square cross-section. Casing 435 and front cover 442 can be made of substantially rigid plastic or metal material. Preferably, casing 435 is made from steel and front cover 442 is made from copper.

Cables 450 and 452 extend into cavity 436 through openings 438 and 440, respectively. The physical makeup of cables 450 and 452 and their respective strands can be varied depending upon the specific resiliency desired by lower bridge 430. Each cable 450 and 452 is made to identical standards. Although various numbers or strands can be employed to form cables 450 and 452, preferably each cable 450 and 452 is formed of six strands. Each cable 450 and 452 having an outer diameter of 0.035 inch.

Each strand forming cables 450 and 452 is preferably 0.008 inch in diameter and is preferably formed from materials similar to that of cables 40 and 42. Further, it is preferred to twist each group of strands of each cable 450 and 452 two to four times per inch in order to obtain the preferred resiliency for each cable 450 and 452. It should be understood that although it is preferred to use identical strands for cables 450 and 452, it is possible to use strands that are not all identical in, for instance, size, diameter, or material.

Each of cables 450 and 452 has a rectangular cap 454 and 456, respectively. Each cap 454 and 456 is rigidly coupled to its respective cable 450 and 452 by any conventional manner; for instance, soldering or welding. Each cap 454 and 456 is sized to fit within cavity 436 so that it can move freely along the cavity 436 but cannot rotate or otherwise angularly move within cavity 436.

The portion of each cable 450 and 452 positioned in side cavity 436 is surrounded by compression springs 460 and 462, respectively. Compression springs 460 and 462 are identical and each is sized with an outer diameter for being slidably received within cavity 436 and sized with an inner diameter to slidably surround one of cables 450 and 452.

Cables 450 and 452 have ends 472 and 474, respectively, that are opposite to caps 454 and 456. Ends 472 and 474 are rigidly attached to frames 12 and 14, respectively, in any conventional manner, preferably by soldering or welding. Thus, when assembled, lower bridge 430 extends between rims 12 and 14 and is rigidly attached to rims 12 and 14.

As seen in FIG. 16, at a rest position and when fully assembled, lower bridge 430 has caps 454 and 456 located at the center of cavity 436 and abutting one another. Springs 460 and 462 are positioned around their respective cables 450 and 452 and are also at a rest position. Spring 460 is positioned within cavity 436 between cap 454 and end wall 444, and spring 462 is positioned within cavity 436 between cap 456 and end wall 446.

When rims 12 and 14 are separated from each other and rotated about upper bridge 220, cables 450 and 452, in turn, are also separated from each other. Springs 460 and 462 allow separation of cables 450 and 452 as illustrated in FIG. 17, but the separation of cables 450 and 452 is resisted by springs 460 and 462. Upon the release of the force that is displacing rims 12 and 14, springs 460 and 462 will then urge caps 454 and 456 and cables 450 and 452 towards each other and towards the rest position at the center of cavity 436.

Springs 460 and 462 are conventional compression springs that are preferably made of metallic material. Springs 460 and 462 are sufficiently resilient to allow rims 12 and 14 to be separated and moved relative to each other about upper bridge 220, while being sufficiently resilient to aid in the return of rims 12 and 14 to their original, rest position. Preferably, springs 460 and 462 are made from 0.010 inch diameter spring steel, have an outer diameter of 0.065 inch, an inner diameter of 0.045 inch, and are formed by six coils of the material. However, it should be understood that bias elements can be formed as elements other than springs, so long as the characteristics of springs 460 and 462 are achieved.

Embodiment of FIGS. 19–25

Referring to FIGS. 19–23, an eyeglass frame 510 is illustrated in accordance with a sixth embodiment of the present invention. Eyeglass frame 510 is substantially identical to eyeglass frame 210 except for the makeup and configuration of upper bridge 520. Accordingly, those portions of eyeglass frame 510 other than upper bridge 520 and its attachment to rims 12 and 14 will not be discussed in detail. Additionally, those elements of eyeglass frame 510 that are substantially identical to elements of the eyeglass frames of the previous embodiments, especially eyeglass frame 210, will employ the reference numerals of the previous embodiments and will not be discussed in great detail.

Figure 22:
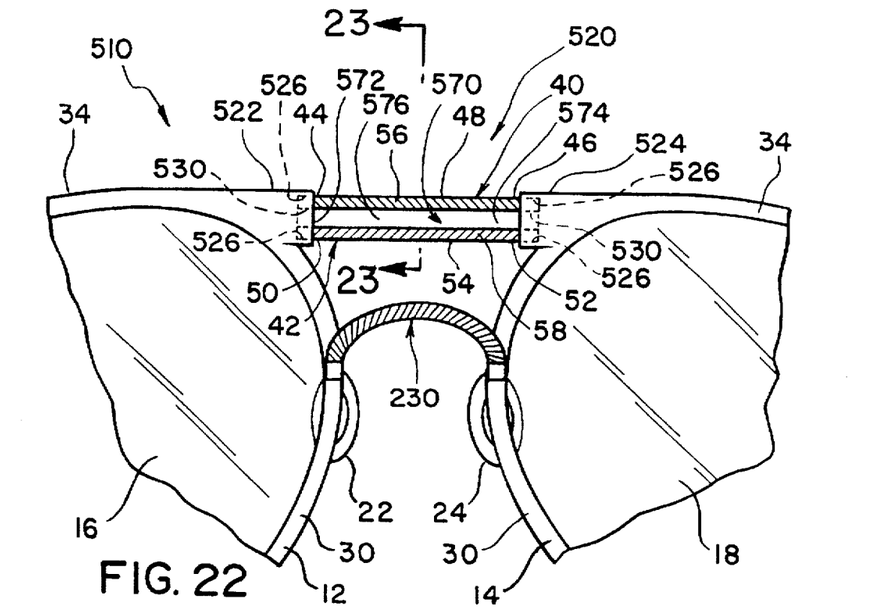
FIG. 22 is a partial front elevational view of the eyeglass frame in accordance with the sixth embodiment of the present invention as illustrated in FIGS. 19–21.
Figure 23:
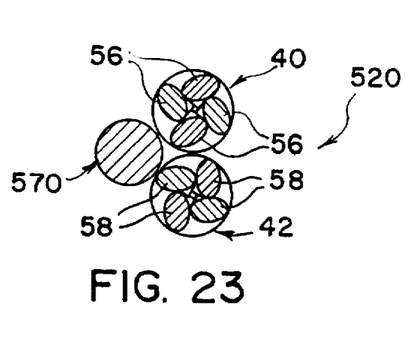
FIG. 23 is an enlarged, cross-sectional view taken along line 23—23 of FIG. 22 showing the upper bridge in accordance with the sixth embodiment of the present invention.

Upper bridge 520 comprises cables 40 and 42 and rotating rod 570. Rotating rod 570 has ends 572 and 574 that extend into supports 522 and 524, respectively. Rotating rod 570 also has an elongated portion 576 extending between ends 572 and 574. Rotating rod 570 is substantially cylindrical and is configured to provide additional support to rims 12 and 14. Rotating rod 570 can be formed in a variety of sizes and materials. Preferably, rotating rod 570 has a diameter of 0.04 inch and is made of metallic material such as steel; for instance, hardened steel or spring steel. However, other non-metallic materials with similar characteristics can be used.

Supports 522 and 524 are identical to supports 222 and 224 described above with respect to eyeglass frame 210 except for the ability of supports 522 and 524 to receive rotating rod 570. Supports 522 and 524 are rigidly attached to rims 12 and 14, respectively, either as a separate attachment or as a one-piece, unitary member.

Supports 522 and 524 each have three bores therein for receiving the elements of upper bridge 520. Each support 522 and 524 has two cable receiving bores 526 and one rod receiving bore 530. Bores 526 and 530 are appropriately sized to receive their respective elements. However, whereas cable receiving bores 526 are ultimately rigidly attached to upper cables 40 and 42 by conventional methods, such as soldering or welding, rod receiving bores 530 are not rigidly coupled to rotating rod 570. Rod receiving bores 530 are sized to receive rotating rod 570 but are sized to allow rotating rods to freely rotate therein. Accordingly, no rigid attachment is made between rotating rod 570 and supports 522 and 524 or rims 12 and 14.

Figure 19:
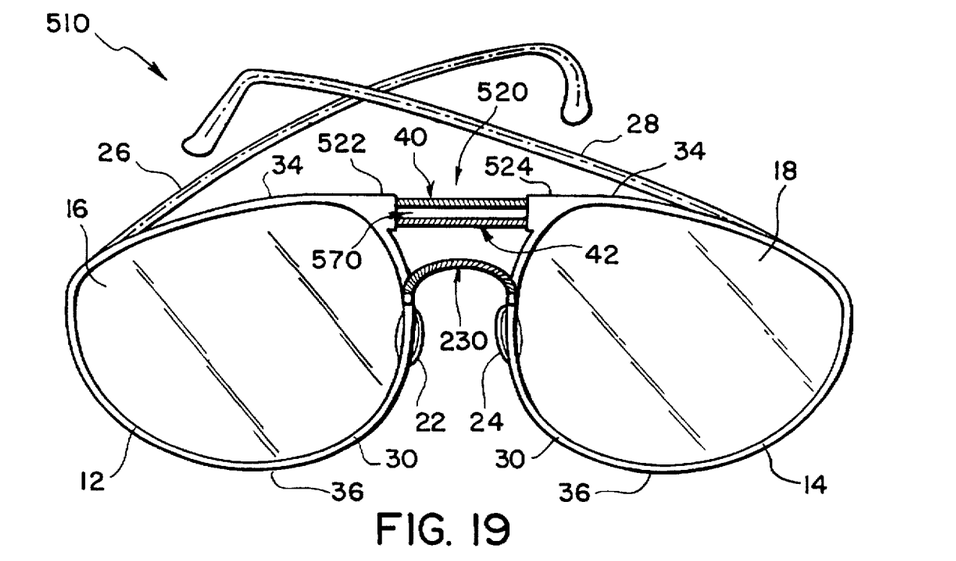
FIG. 19 is a front elevational view of an eyeglass frame in accordance with a sixth embodiment of the present invention.
Figure 20:
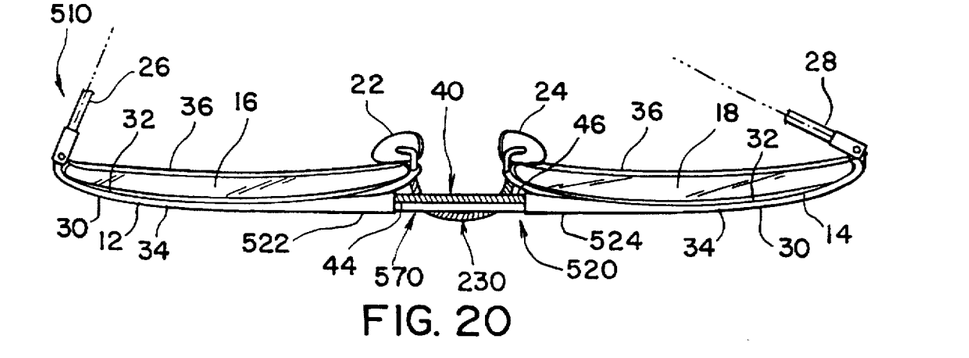
FIG. 20 is a top, plan view of the eyeglass frame in accordance with the sixth embodiment of the present invention as illustrated in FIG. 19, and showing the rims and their respective lenses in their original, rest position.
Figure 21:
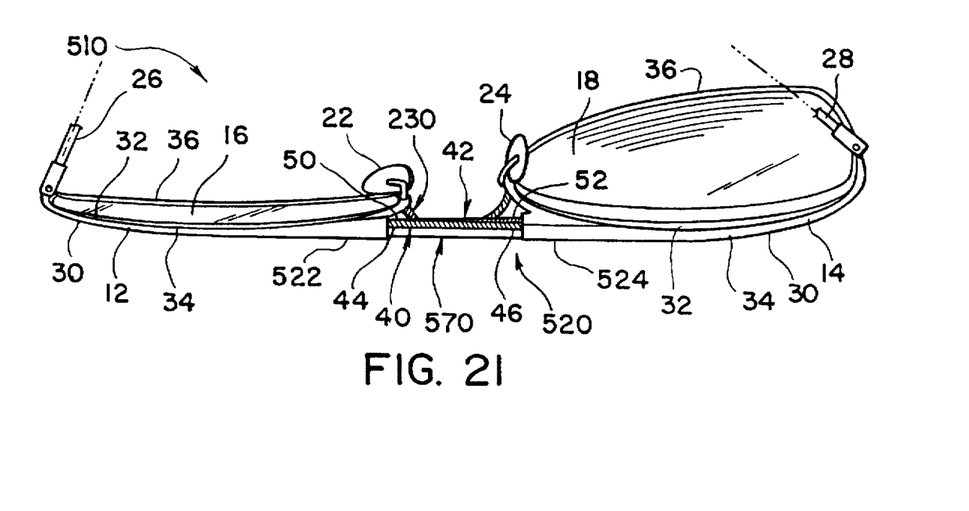
FIG. 21 is a top, plan view of the eyeglass frames in accordance with the sixth embodiment of the present invention illustrated in FIGS. 19 and 20, and showing one rim with its respective lens rotated about the upper bridge to a displaced position.

Cables 40 and 42 act in a substantially identical manner as described above with the previous embodiments and are configured with reverse twist. The only difference with respect to cables 40 and 42 is that in eyeglass frame 510 they are provided with rotating rod 570 to provide added stability. When one of rims 12 and 14 rotate about upper bridge 520 the rotating rims 12 and 14 rotate about rotating rod 570. Thus, as rims 12 and 14 rotate relative to each other, cables 40 and 42 rotate around each other and the two cables 40 and 42 together begin to rotate around rotating rod 570.

Rotating rod 570 has a small affect on the torsional resistances of upper bridge 520 but provides significant stiffness in limiting the amount of bending between rims 12 and 14 about axes that are perpendicular to the longitudinal direction of rotating rod 570 and upper bridge 520.

As seen in FIG. 23, cables 40 and 42 are arranged adjacent to each other in a vertical arrangement with rotating rod 570 located between cables 40 and 42 towards front 30 of rims 12 and 14. Alternatively, upper bridge 520 can be configured in various configurations of cables 40 and 42 and rotating rod 570 while still producing the desired characteristics of upper bridge 520 achieved by the configuration illustrated in FIG. 23. Examples of some of the possible configurations of cables 40 and 42 and rotating rod 570 are illustrated in FIGS. 23A, 24 and 25.

Figure 23A:
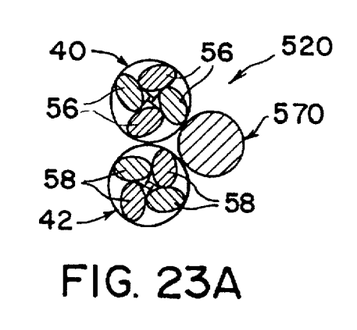
FIG. 23A is a cross-sectional view similar to that of FIG. 23 but showing an alternative configuration of the cables and rotating bar for the upper bridge in accordance with the sixth embodiment of the invention as illustrated in FIGS. 19–23.

As seen in FIG. 23A, cables 40 and 42 are arranged in the same configuration as in FIG. 23. However, rotating rod 570 is positioned on the opposite side of cables 40 and 42, behind them and adjacent rear 32 of rims 12 and 14.

Figure 24:
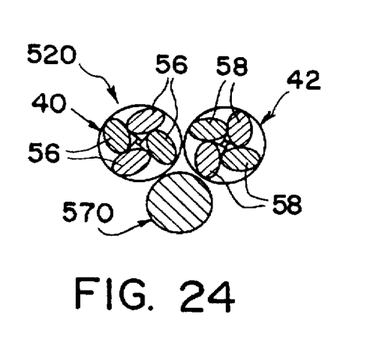
FIG. 24 is a cross-sectional view similar to that of FIG. 23 but showing an alternative configuration of the cables and rotating bar for the upper bridge in accordance with the sixth embodiment of the invention as illustrated in FIGS. 19–23.

In FIG. 24, cables 40 and 42 and rotating rod 570 are in the same relative configuration illustrated in FIG. 23, except that in FIG. 24, the cables 40 and 42 and rotating rod 570 are shifted 90°. This 90° shifting results in cables 40 and 42 positioned adjacent each other in a horizontal plane with rotating rod 570 positioned between cables 40 and 42 and facing bottom 36 of rims 12 and 14. As seen in FIG. 25, rotating rod 570 is positioned between cables 40 and 42. Additionally, cables 40 and 42 and rotating rod 570 are all positioned in the same horizontal plane.

Figure 25:
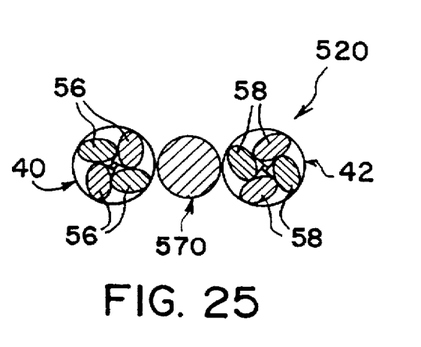
FIG. 25 is a cross-sectional view similar to that of FIGS. 23 and 24 but showing another alternative configuration of the cables and rotating bar for the upper bridge in accordance with the sixth embodiment of the present invention as illustrated in FIGS. 19–23.

Of course, supports 522 and 524 must be configured differently for each of the configurations illustrated in FIGS. 23-25. However, regardless of the configuration of cables 40 and 42 and rotating rod 570 employed, cables 40 and 42 remain arranged with opposing directions of twist and rotating rod 570 remains freely rotating within supports 522 and 524.

Figure 26:
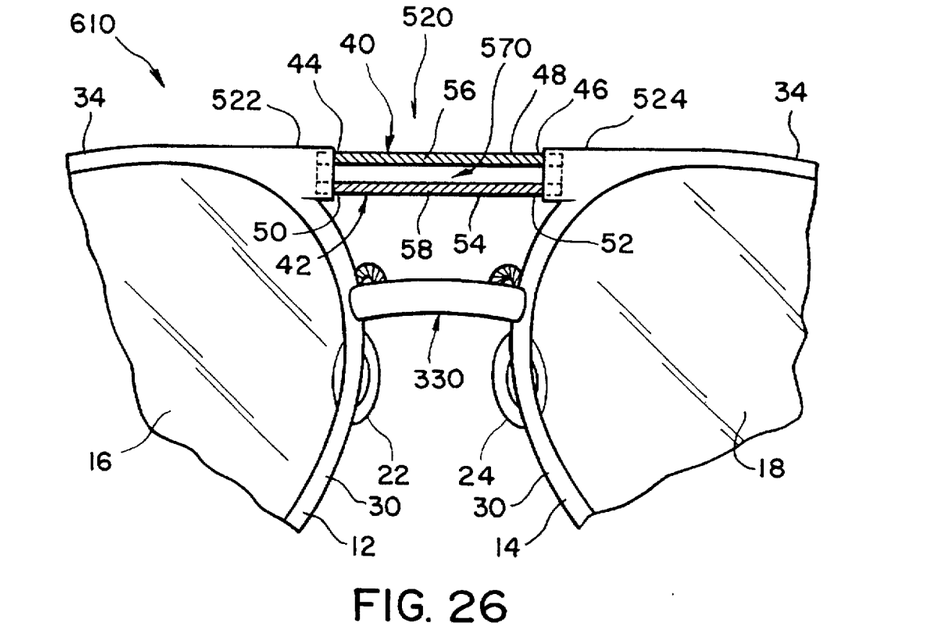
FIG. 26 is a partial, front elevational view of an eyeglass frame in accordance with a seventh embodiment of the present invention.

Embodiment of FIG. 26

Referring to FIG. 26, an eyeglass frame 610 in accordance with a seventh embodiment of the present invention is illustrated. Eyeglass frame 610 is substantially identical to eyeglass frame 510 as illustrated in FIGS. 19–23 except for the specific lower bridge employed in eyeglass frame 510. Eyeglass frame 610 employs lower bridge 330 which is illustrated in FIGS. 14 and 15 and is described with respect to eyeglass frame 310. Additionally, those elements of eyeglass frame 610 that are substantially identical to elements of the eyeglass frames of the previous embodiments, especially eyeglass frames 310 and 510, will employ the reference numerals of the previous embodiments and will not be further discussed. Since all of the elements of eyeglass frame 610 have been previously discussed, eyeglass frame 610 will not be discussed in further detail.

Figure 27:
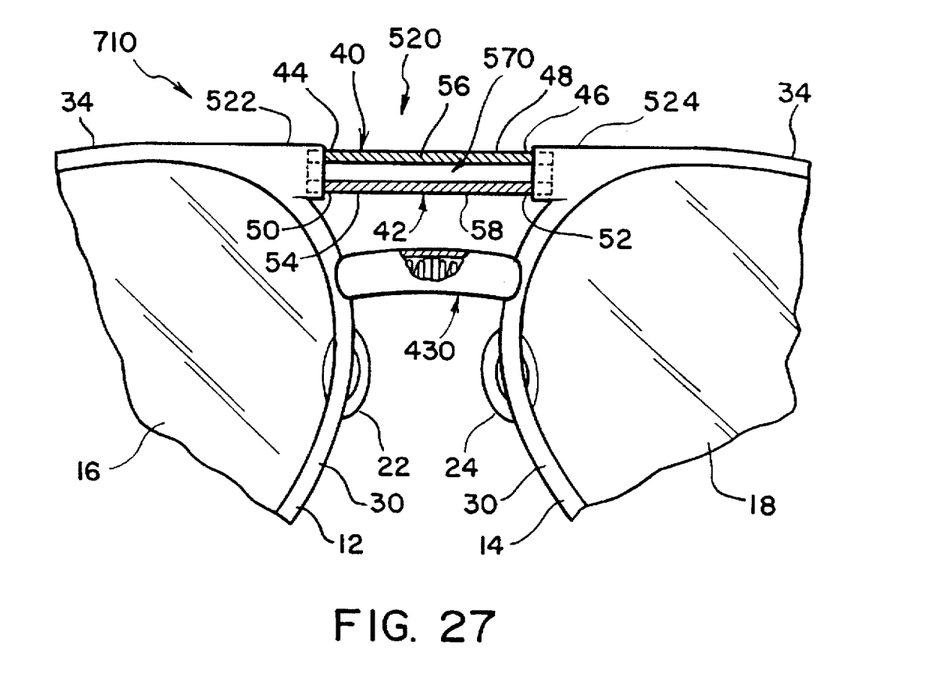
FIG. 27 is a partial, front elevational view of an eyeglass frame in accordance with an eighth embodiment of the present invention.

Embodiment of FIG. 27

Referring to FIG. 27, an eyeglass frame 710 in accordance with an eighth embodiment of the present invention is illustrated. Eyeglass frame 710 is substantially identical to eyeglass frames 510 and 610 except for the specific lower bridge. Eyeglass frame 710 employs lower bridge 430 as illustrated in FIGS. 16–18 and described with respect to eyeglass frame 410. Additionally, those elements of eyeglass frame 710 that are substantially identical to elements of the eyeglass frames of the previous embodiments, especially eyeglass frames 410, 510 and 610, will employ the reference numerals of the previous embodiments and will not be further discussed. Since all of the elements of eyeglass frame 710 have been previously discussed, eyeglass frame 710 will not be discussed in further detail.

Embodiment of FIGS. 28-31

Referring to FIGS. 28–31, an eyeglass frame 810 in accordance with a ninth embodiment of the present invention is illustrated. Eyeglass frame 810 is substantially identical to eyeglass frame 10 except for the bridge. Eyeglass frame 810 employs upper bridge 520 as illustrated in FIGS. 19–27 and described with respect to eyeglass frame 510. Additionally, those elements of eyeglass frame 810 that are substantially identical to elements of the eyeglass frames of the previous embodiments, especially eyeglass frames 10 and 510, will employ the reference numerals of the previous embodiments and will not be further discussed.

Figure 28:
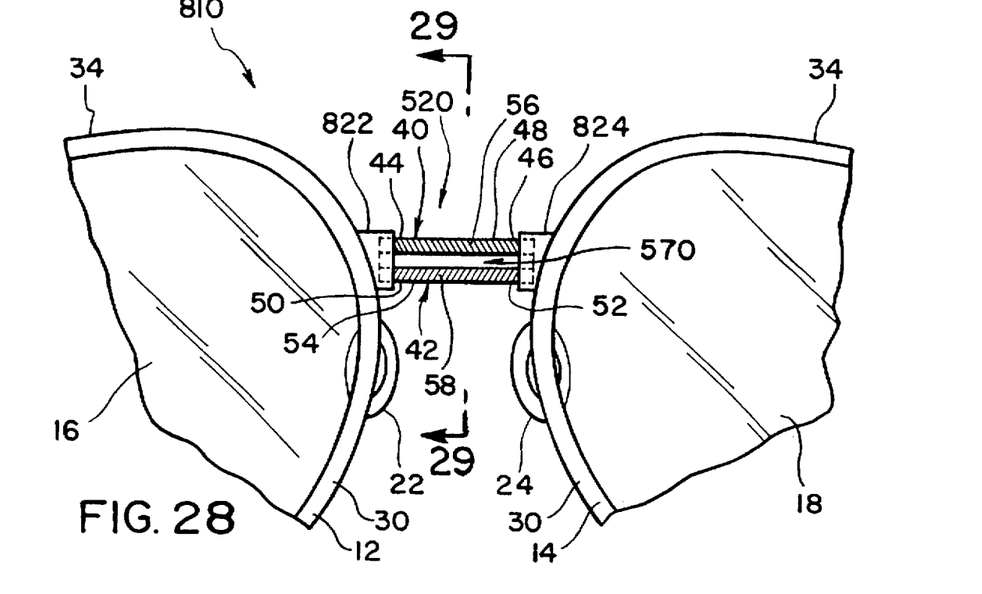
FIG. 28 is a partial front elevational view of an eyeglass frame in accordance with a ninth embodiment of the present invention.

Eyeglass frame 810 employs upper bridge 520 as its only bridge. Basically, eyeglass frame 810 comprises eyeglass frame 10 as described with respect to the first embodiment with rotating rod 570 added to bridge 40. This is accomplished by providing supports 822 and 824 on rims 12 and 14, respectively. Supports 822 and 824 are identical to supports 522 and 524 as described above with respect to eyeglass frame 510 except for their location on rims 12 and 14. Supports 822 and 824 being positioned lower on rims 12 and 14 than supports 522 and 524 but still rigidly receiving cables 40 and rotatably receiving rod 570.

Figure 29:
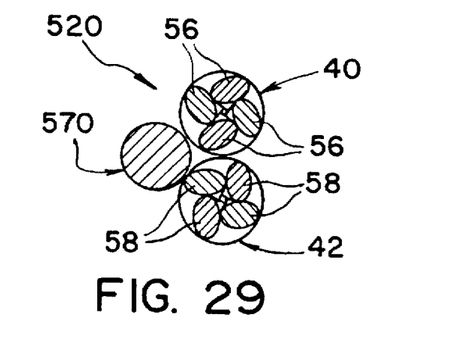
FIG. 29 is an enlarged, cross-sectional view taken along line 29—29 of FIG. 28 showing the bridge in accordance with the ninth embodiment of the present invention.

As seen in FIG. 29, cables 40 and 42 are arranged adjacent to each other in a vertical arrangement with rotating rod 570 located between cables 40 and 42 towards front 30 of rims 12 and 14. Alternatively, upper bridge 520 can be configured in various configurations of cables 40 and 42 and rotating rod 570 while still producing the desired characteristics of upper bridge 520 achieved by the configuration illustrated in FIG. 29. Examples of some of the possible configurations of cables 40 and 42 and rotating rod 570 are illustrated in FIGS. 30 and 31.

Figure 30:
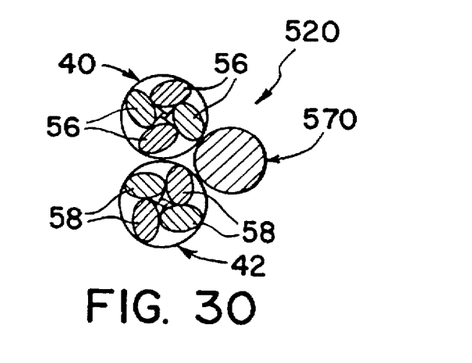
FIG. 30 is a cross-sectional view similar to that of FIG. 29 but showing an alternative configuration of the cables and rotating bar for the bridge in accordance with the ninth embodiment of the invention as illustrated in FIGS. 28 and 29.

As seen in FIG. 30, cables 40 and 42 are arranged in the same configuration as in FIG. 29. However, rotating rod 570 is positioned on the opposite side of cables 40 and 42, behind them and adjacent rear 32 of rims 12 and 14.

Figure 31:
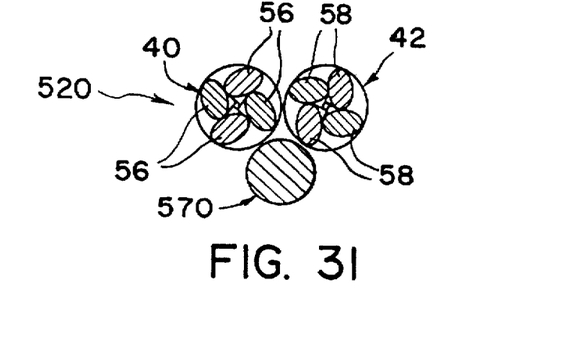
FIG. 31 is a cross-sectional view similar to that of FIGS. 29 and 30 but showing another alternative configuration of the cables and rotating bar for the bridge in accordance with the ninth embodiment of the present invention as illustrated in FIGS. 28 and 29.

In FIG. 31, cables 40 and 42 and rotating rod 570 are in the same relative configuration illustrated in FIG. 29, except that in FIG. 31, cables 40 and 42 and rotating rod 570 are shifted 90°. This. 90° shifting results in cables 40 and 42 positioned adjacent each other in a horizontal plane with rotating rod 570 positioned between cables 40 and 42 and facing bottom 36 of rims 12 and 14.

Of course, supports 822 and 824 must be configured differently for each of the configurations illustrated in FIGS.

29–31. However, regardless of the configuration of cables 40 and 42 and rotating rod 570 employed, cables 40 and 42 remain arranged with opposing directions of twist and rotating rod 570 remains freely rotating within supports 822 and 824.

While advantageous embodiments have been chosen to illustrate the invention, it will be understood by those skilled in the art that various changes and modifications can be made therein without departing from the scope of the invention as defined in the appended claims.

What is claimed is:

1. A frame comprising:

first and second securing members for receiving lenses;

a retaining device coupled to said first and second securing members for positioning said frame over the user's eyes; and a first bridge coupled between said first and second securing members and having first and second resilient elements for allowing said first and second securing members to pivot about said first bridge between an original position and displaced positions while biasing said first and second securing members toward said original position, each of said first and second resilient elements having first and second ends and a body section extending in a longitudinal direction between said first and second ends, each of said first ends being rigidly coupled to said first securing member and each of said second ends being rigidly coupled to said second securing member, each of said first and second resilient elements having a first torsional resistance to a torsional force applied in a first torsional direction that is transverse to said longitudinal direction of said body section, and a second torsional resistance to the torsional force applied in a second, opposite torsional direction that is transverse to said longitudinal direction of said body section, and said first torsional resistance being greater than said second torsional resistance.

2. A frame according to claim 1, wherein each of said first and second resilient elements has multiple strands extending between said first and second ends.

3. A frame according to claim 2, wherein said multiple strands of said first resilient element are twisted about each other to form a first cable and said multiple strands of said second resilient element are twisted about each other to form a second cable.

4. A frame according to claim 3, wherein said multiple strands of said first resilient element twist about each other in a first direction, and said multiple strands of said second resilient element twist about each other in a second direction that is opposite to said first direction.

5. A frame according to claim 4, and further comprising:

a second bridge coupled between said first and second securing members, said second bridge comprising a resilient member.

6. A frame according to claim 5, wherein said resilient member comprises at least one cable formed from multiple strands.

7. A frame according to claim 1, wherein said first bridge further comprises a rotating member having a first end, a second end, and an elongated portion, said first and second ends of said rotating member being rotatable coupled to said first and second securing members, respectively.

8. A frame according to claim 7, wherein said rotating member is substantially cylindrical and is positioned between said first and second resilient elements.

9. A frame according to claim 8, and further comprising:

a second bridge coupled between said first and second securing members, said second bridge comprising a resilient member.

10. A frame according to claim 9, wherein said resilient member comprises at least one cable formed from multiple strands.

11. A frame according to claim 10, wherein said at least one cable of said second bridge comprises third and fourth cables, said third cable having a first end rigidly coupled to said first securing member and a second end coupled to an intermediate member, said fourth cable having a first end rigidly coupled to said second securing member and a second end coupled to said intermediate member, said intermediate member allowing said third and fourth cables to move away from each other while biasing said third and fourth cables toward each other.

12. A frame according to claim 11, wherein said intermediate member comprises first and second bias elements, said first bias element biasing said third cable towards said fourth cable, and said second bias element biasing said fourth cable towards said third cable and being spaced from said first bias element.

13. A frame comprising:

first and second securing members for receiving lenses;

a retaining device coupled to said first and second securing members for positioning said frame over eyes; and a first bridge coupled between said first and second securing members and having first and second resilient elements, each of said first and second resilient elements having first and second ends and a body section extending in a longitudinal direction between said first and second ends, each of said first ends being rigidly coupled to said first securing member and each of said second ends being rigidly coupled to said second securing member, each of said first and second resilient elements being sufficiently resilient so that each of said first and second securing members can be pivoted about said first bridge from an original position in two, different rotational directions while said first and second resilient elements twist about each other, said first and second resilient elements acting to return each of said first and second securing members to said original position.

14. A frame according to claim 13, wherein each of said first and second resilient elements has multiple strands extending between said first and second ends.

15. A frame according to claim 14, wherein said multiple strands of said first resilient element are twisted about each other to form a first cable and said multiple strands of said second resilient element are twisted about each other to form a second cable.

16. A frame according to claim 15, wherein said multiple strands of said first resilient element twist about each other in a first direction, and said multiple strands of said second resilient element twist about each other in a second direction that is opposite to said first direction.

17. A frame according to claim 16, and further comprising:

a second bridge coupled between said first and second securing members, said second bridge comprising a resilient member.

18. A frame according to claim 17, wherein said resilient member comprises at least one cable formed from multiple strands.

19. A frame according to claim 13, wherein said first bridge further comprises a rotating member having a first end, a second end, and an elongated portion, said first and second ends of said rotating member being rotatably coupled to said first and second securing members, respectively.

20. A frame according to claim 19, wherein said rotating member is substantially cylindrical and is positioned between said first and second resilient elements.

21. A frame according to claim 20, and further comprising:

a second bridge coupled between said first and second securing members, said second bridge comprising a resilient member.

22. A frame according to claim 21, wherein said resilient member comprises at least one cable formed of multiple strands.

23. A frame according to claim 22, wherein said at least one cable of said second bridge comprises third and fourth cables, said third cable having a first end rigidly coupled to said first securing member and a second end coupled to an intermediate member, said fourth cable having a first end rigidly coupled to said second securing member and a second end coupled to said intermediate member, said intermediate member allowing said third and fourth cables to move away from each other while biasing said third and fourth cables toward each other.

24. A frame according to claim 23, wherein said intermediate member comprises first and second bias elements, said first bias element biasing said third cable towards said fourth cable, and said second bias element biasing said fourth cable towards said third cable and being spaced from said first bias element.

25. A frame comprising:

first and second securing members for receiving lenses;

a retaining device coupled to said first and second securing members for positioning said frame over eyes; and a first bridge coupled between said first and second securing members and having first and second cables for allowing said first and second securing members to pivot about said first bridge between an original position and displaced positions while biasing said first and second securing members toward said original position, each of said first and second cables having first and second ends and a body section extending in a longitudinal direction between said first and second ends, each of said first ends being rigidly coupled to said first securing member and each of said second ends being rigidly coupled to said second securing member, each of said first and second cables comprising multiple strands that are twisted around each other, said multiple strands of said first cable twisting in a first direction, said multiple strands of said second cable twisting in a second direction and said first direction being opposite to said second direction.

26. A frame according to claim 25, wherein said first securing member is coupled to a first lens for positioning over an eye, and said second securing member is coupled to a second lens for positioning over another eye.

27. A frame comprising:

first and second securing members for receiving lenses;

a retaining device coupled to said first and second securing members for positioning said frame over the user's eyes; and a first bridge coupled between said first and second securing members and having first and second resilient elements, each of said first and second resilient elements including a spirally-wrapped, multi-strand cable.

28. A frame according to claim 27, wherein said first bridge further comprises a rotating member having a first end, a second end, and an elongated portion, said first and second ends of said rotating member being rotatably coupled to said first and second securing members, respectively.

29. A frame according to claim 28, wherein said rotating member has a passageway, and each of said first and second resilient elements extend completely through said passageway.

30. A frame according to claim 28, wherein said rotating member is positioned between said first and second resilient elements.

31. A frame according to claim 30, and further comprising:

a second bridge coupled between first and second securing members, and said rotating member being positioned between said first and second resilient elements and said second bridge.

32. A frame according to claim 30, and further comprising:

a second bridge coupled between said first and second securing members, and one of said first and second resilient elements being positioned between said rotating member and said second bridge.

33. A frame according to claim 30, wherein first resilient element is spaced from said second resilient element and positioned on an opposite side of said rotating member from said second resilient element.

34. A frame according to claim 27, and further comprising:

a second bridge coupled between said first and second securing members, and said second resilient element positioned between said first resilient element and said second bridge.

35. A frame according to claim 27, and further comprising:

a second bridge coupled between said first and second securing members, said second bridge comprising a cable and a cover having a channel, said cable extending completely through said channel and said cover completely surrounding at least a portion of said cable.

* * * * *